United States Patent
Song et al.

(10) Patent No.: US 8,359,030 B2
(45) Date of Patent: Jan. 22, 2013

(54) METHOD AND APPARATUS OF SEARCHING FOR BASE STATION USING PAGING PROCEDURE IN MOBILE COMMUNICATION NETWORK

(75) Inventors: Jae Su Song, Daejeon (KR); Seung-Kwon Baek, Daejeon (KR); Jin-Up Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 132 days.

(21) Appl. No.: 12/958,842

(22) Filed: Dec. 2, 2010

(65) Prior Publication Data

US 2012/0004004 A1    Jan. 5, 2012

(30) Foreign Application Priority Data

Jul. 2, 2010    (KR) .................. 10-2010-0063840

(51) Int. Cl.
*H04W 4/00* (2009.01)

(52) U.S. Cl. ............... 455/433; 455/426.1; 455/458; 455/515; 370/310.2; 370/328

(58) Field of Classification Search .......... 455/426.1, 455/433, 458, 515; 370/310.2, 328
See application file for complete search history.

(56) References Cited

U.S. PATENT DOCUMENTS

| | | | |
|---|---|---|---|
| 6,980,820 B2* | 12/2005 | Sinnarajah et al. | 455/515 |
| 7,228,143 B1* | 6/2007 | Hamalainen et al. | 455/458 |
| 7,417,971 B2* | 8/2008 | Jeong et al. | 370/331 |
| 7,724,706 B2* | 5/2010 | Kang et al. | 370/331 |
| 2006/0189331 A1 | 8/2006 | Lundsjo et al. | |
| 2006/0205429 A1* | 9/2006 | Ryoo | 455/518 |
| 2008/0014969 A1 | 1/2008 | Laroia et al. | |
| 2012/0034918 A1* | 2/2012 | Park et al. | 455/435.1 |

FOREIGN PATENT DOCUMENTS

| | | |
|---|---|---|
| KR | 10-2005-0122241 | 12/2005 |
| KR | 10-2009-0042473 | 4/2009 |
| KR | 10-2009-0117570 | 11/2009 |

* cited by examiner

*Primary Examiner* — Steve D Agosta
(74) *Attorney, Agent, or Firm* — Staas & Halsey LLP

(57) ABSTRACT

A method for searching for a base station using paging procedure in a mobile communication network has a paging agent that performs the paging procedure. The method includes: receiving, at the paging agent, subscriber information including information of a service, to which a mobile node subscribed, from a home location register while performing a location registration procedure in response to a location registration request from the mobile node; setting an available scan time based on the time required to perform the paging procedure; generating a paging request message including the available scan time and the subscriber information to send the paging request message to a base station required for paging; and generating base station information based on the subscriber information to input into the paging request message to transmit with the available scan time to the mobile node.

13 Claims, 5 Drawing Sheets

METHOD AND APPARATUS OF SEARCHING FOR BASE STATION USING PAGING PROCEDURE IN MOBILE COMMUNICATION NETWORK

CROSS-REFERENCE(S) TO RELATED APPLICATION

The present invention claims priority of Korean Patent Application No. 10-2010-0063840, filed on Jul. 2, 2010, which is incorporated herein by reference.

FIELD OF THE INVENTION

The present invention relates to a mobile node's search for a base station, and more particularly, to a method and apparatus for searching for a base station using a paging procedure in a mobile communication network, which can minimize the base station search time of a mobile node, as well as minimizing the power consumption of the mobile node.

BACKGROUND OF THE INVENTION

Figure 2:
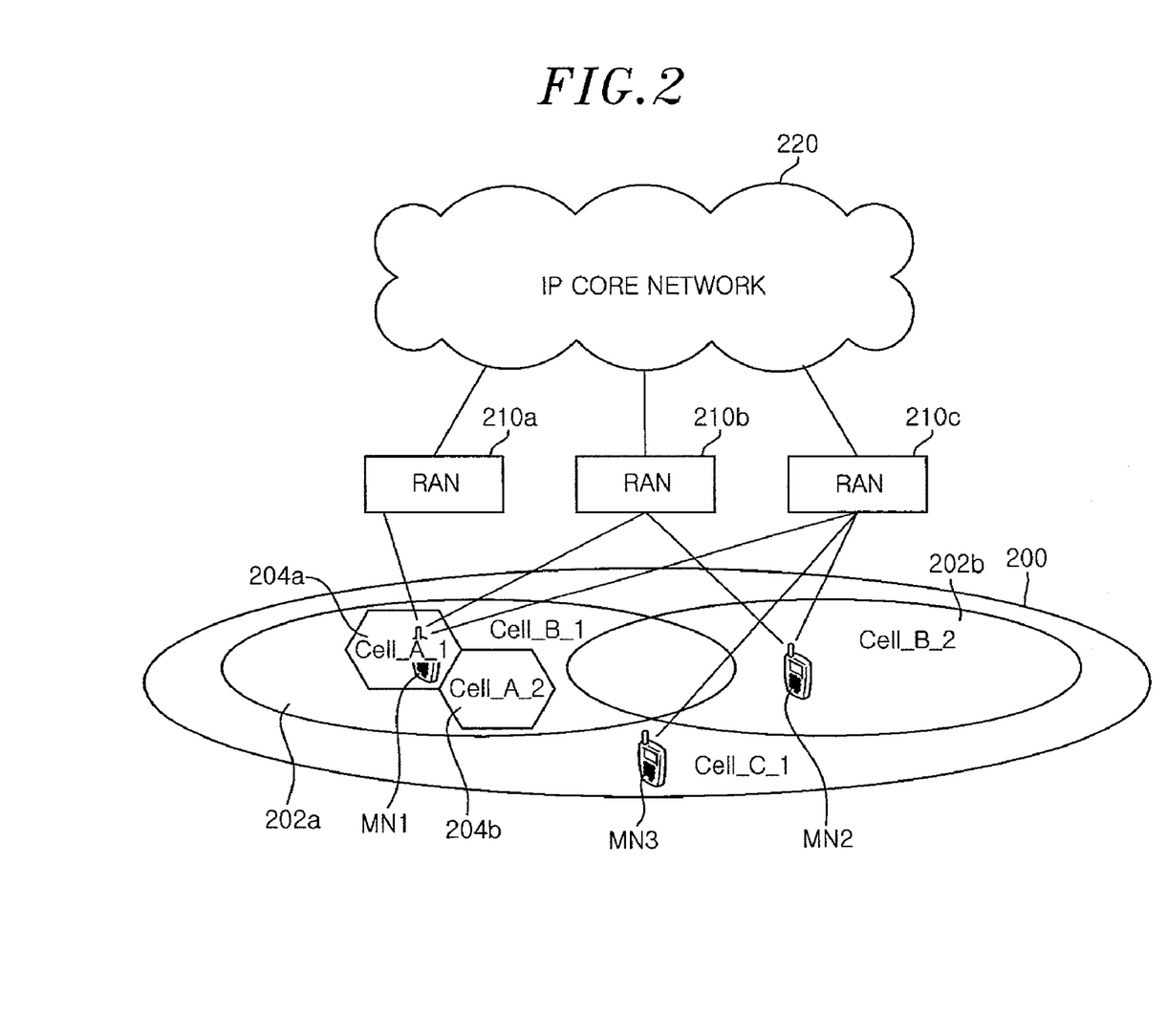
FIG. 2 is a view illustrating the configuration of a mobile communication network in a multi-RAT environment in accordance with an embodiment of the present invention.

With the development of the mobile communication systems, communication systems of various radio access technologies (RATs) are emerging, and networks suitable for such communication systems are being established. Such a network infrastructure is installed independently by a number of service providers. Thus, as shown in FIG. 2, base stations of different RATs overlap with each other at the same point.

Moreover, these communication systems each have different characteristics. Thus, while there are systems that provide low mobility but high bandwidth, there are also systems that provide low bandwidth but high mobility and wide coverage.

To match with these communication systems, research on multimode terminals for supporting communication systems of different RAT in one terminal is underway in terms of terminals, and, recently, terminals supporting multi-modes are being launched into the market.

In this circumstance, there is a need for a user to decide an optimum communication system among those communications system of different RATs to connect and get service. Moreover, to make such a decision, it is necessary for a terminal to recognize a base station accessible from the current location. If no accessible base station is found, all interfaces have to be operated to measure signals and find an accessible system, which requires long time and large power consumption.

Therefore, studies on the technology to minimize power consumption and fast search for an accessible base station have been conducted. Such a technology is called a base station search, which is divided into three depending on its methods.

The first is a method in which a terminal transmits information required for a base station search in a network, which is called a centralized method. In this method, the terminal determines a base station to be accessed based on the information provided from the network. To this end, a server for storing and managing base station location information of each communication system is installed in the network. Also, there is a need for measures to transmit this information to the terminal.

The second is a method in which a terminal measures radio signals and finds an accessible base station without prior information, which is called a distributed method. In this method, a wireless interface of a communication network expected to be accessible by a terminal is switched on to receive pilots or beacons of the communication system and then the presence or absence of the communication system is determined based on the received pilots or beacons.

The third is a combination of the above two methods, which is called a hybrid method. In this method, a network provides base station location information to a terminal so that the terminal performs a search for a base station of an actual communication system based on the base station location information. Measures to provide network base station information to enable a terminal to perform a base station search have been suggested to have the same concept although the functions and names are slightly different depending on research organizations and standard-setting organizations. CPC (Cognitive Pilot Channel), which is proposed in the E2R project in Europe, is also within this concept.

Hereinafter, a process in which a mobile terminal searches for a base station by a paging procedure when a paging area changes will be described with reference to the accompanying drawings.

Figure 1:
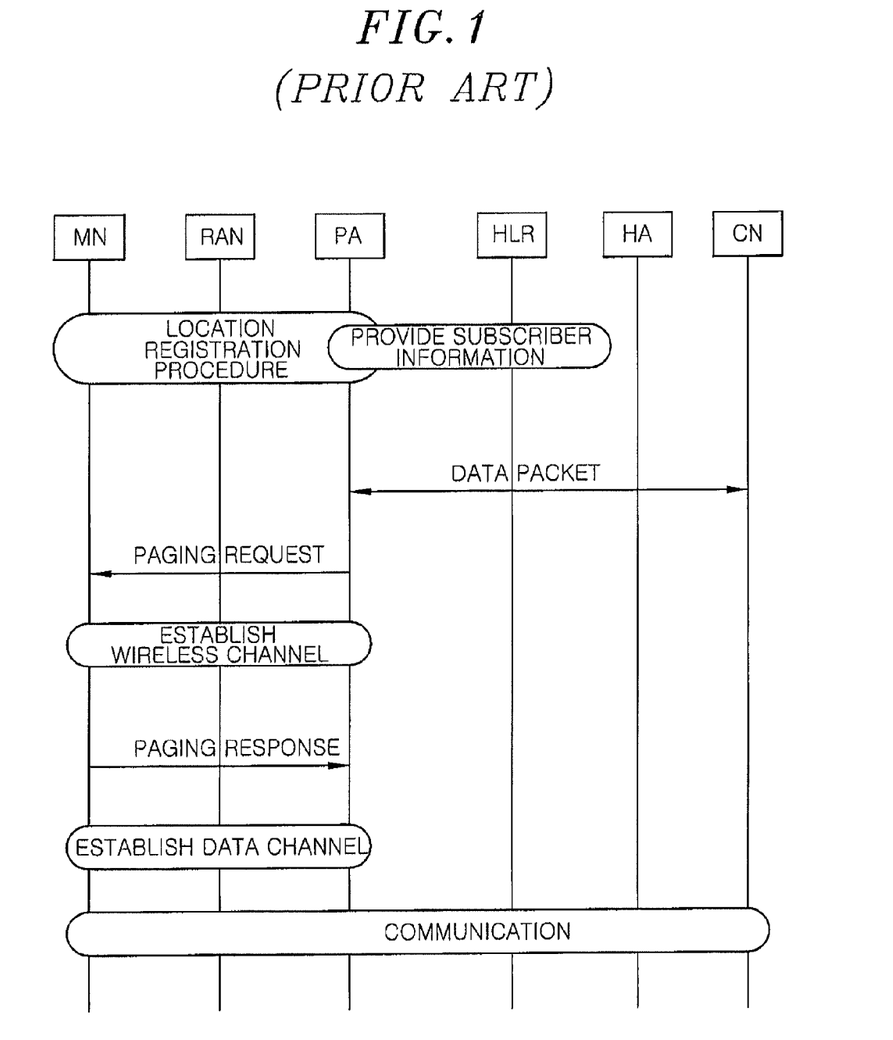
FIG. 1 is a flowchart showing a conventional paging procedure.

FIG. 1 is a flowchart showing a conventional paging procedure. First, when a paging area changes, a mobile node (MN) is connected to a paging agent (PA) via a radio access network (RAN) serving as an access network to perform a location registration procedure. Then, the paging agent receives subscriber information of the mobile node from a home location register (HLR) to check whether the mobile node can get a location registration service at the current location by using the subscriber information.

Upon completion of check on the mobile by using the subscriber information, the paging agent completes the location registration procedure. Then, upon receipt of a packet from a counterpart node, the paging agent sends a paging request message to all RANs within a paging area where the location of the mobile node is registered. The paging request message contains quality of service (QoS) of a data packet having issued the paging and the ID of mobile node. Among mobile nodes that have received the paging request message, a mobile node whose ID matches the ID of the mobile node within the paging request message establishes a wireless channel with the paging agent. Then, the mobile node sends a paging response message for the paging request message to the paging agent, and the remaining mobile nodes are transited to an idle state.

The paging agent, which has received the paging response message, establishes a data channel with the mobile node depending on the QoS information of the packet, so that the mobile node performs communication with the counter node.

The conventional base station search method has the drawback of high power consumption since it has to be carried out periodically in the idle state without being taken into account in the paging step.

Moreover, in the conventional base station search method, in order for a mobile node to search for an optimum base station, a base station search has to be performed periodically all the time to get information of a base station accessible from the current location. To this end, the base station search has to be performed constantly even in the idle state, resulting in increased power consumption.

SUMMARY OF THE INVENTION

Therefore, the present invention provides a method and apparatus for searching for a base station using a paging procedure in a mobile communication network, which allows a mobile node to receive information of a base station, to which the subscriber subscribed, and then to perform a base station search by a paging procedure.

The present invention further provides a method and apparatus for searching for a base station using a paging procedure in a mobile communication network, which allows a mobile node to perform a base station search during a period of time from the reception of a paging request message to the transmission of a paging response.

In accordance with an aspect of the present invention, there is provided a method for searching for a base station using a paging procedure in a mobile communication network having a paging agent that performs the paging procedure. The method includes: receiving, at the paging agent, subscriber information including information of a service, to which a mobile node subscribed, from a home location register while performing a location registration procedure in response to a location registration request from the mobile node; setting an available scan time based on the time required to perform the paging procedure; generating a paging request message including the available scan time and the subscriber information to send the paging request message to a base station required for paging; and generating base station information based on the subscriber information to input into the paging request message to transmit with the available scan time to the mobile node. The mobile node selects a base station by using the base station information within a range of the available scan time.

In accordance with another aspect of the present invention, there is provided an apparatus for searching for a base station using a paging procedure in a mobile communication network. The apparatus includes: a home location register for managing subscriber information containing information of services to which multiple mobile nodes subscribed; a paging agent for, upon receipt of a location registration request from a given mobile node, requesting the home location register to provide the subscriber information containing information of a service to which the given mobile node subscribed and receiving the subscriber information while performing a location registration procedure, calculating an available scan time based on the time required to perform the paging procedure upon completion of the location registration for the given mobile node, and then generating a paging request message containing the available scan time and the subscriber information to send the paging request message to a base station required for paging; and the base station required for paging for generating base station information based on the subscriber information to input into the paging request message to transmit with available scan time to the given mobile node.

The given mobile node selects a base station by using the base station information within a range of the available scan time.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, embodiments of the present invention will be described with reference to the accompanying drawings which form a part hereof.

FIG. 2 is a view illustrating a configuration of a mobile communication network in a multi-RAT (multiple-Radio Access Technology) environment in accordance with an embodiment of the present invention.

As illustrated therein, one macro cell 200 includes multiple cells 202a, 202b, 204a, and 204b and RANs (Radio Access Networks) 210a, 210b, and 210c, which are multiple access networks provided on the cells 202a, 202b, 204a, and 204b and the macro cell 200. Here, the RANs 210a to 210c connect the cells 202a to 204b and mobile nodes (MNs) in the macro cell 200 to an IP core network 220.

In a base station environment as shown in FIG. 2, the RANs 210a and 210b are included in the RAN 210c, and the mobile nodes MN_1 subscribes services from the RAN 210a and the RAN 210c. Since the RAN 210c is an access network required for paging, i.e., an access network already known to the mobile node MN_1, the mobile node MN_1 does not need to perform a base station search for the RAN 210c. Base station information (RAN_info) provided to the mobile nodes MN_1 and MN_2 in a paging procedure in this manner is shown in the following Table 1:

TABLE 1

| All of base stations in Cell_C | Mobile node | Subscriber information | Base station information for each mobile node |
|---|---|---|---|
| Cell_A_1, Cell_A_2 | MN_1 | RAN_A, RAN_C | Cell_A_1, Cell_A_2 |
| Cell_B_1, Cell_B_2 | MN_2 | RAN_B, RAN_C | Cell_B_1, Cell_B_2 |

Figure 3:
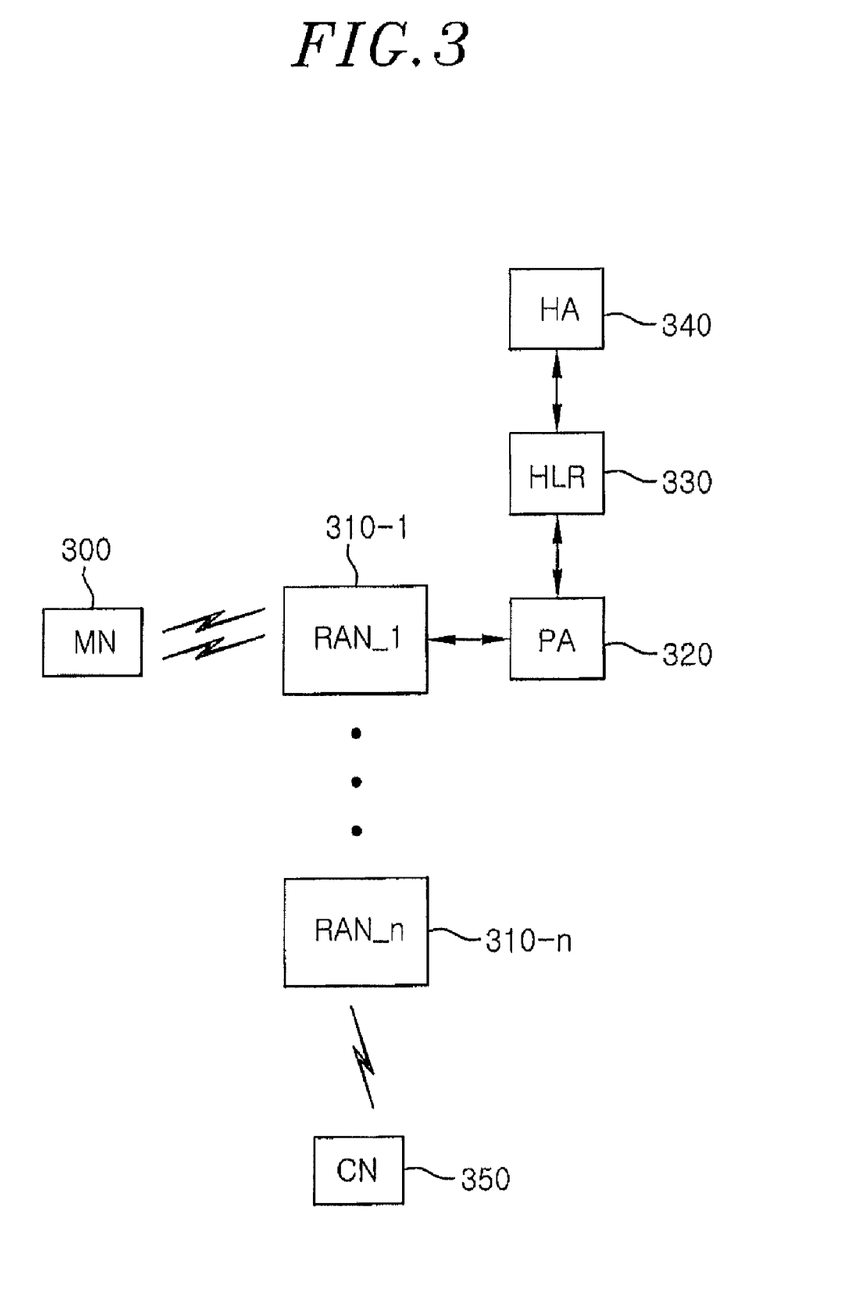
FIG. 3 is a block diagram illustrating a mobile communication system in accordance with the embodiment of the present invention.

A mobile communication system of the mobile communication network configuration includes, as shown in FIG. 3, an mobile node (MN) 300 for receiving paging; RANs 310_1 to 310_n which are access networks present for respective RATs; a paging agent (PA) 320 which is a core network entity responsible for a mobility management and paging function of the mobile node 300; a home location register (HLR) 330 which is a database for managing subscriber information; a home agent (HA) 340 which is an entity of a home network for performing an mobile IP function; and a counterpart node (CN) 350 for performing communication with the mobile node 300.

The HLR 330 in accordance with the embodiment of the present invention stores subscriber information representing services to which the nodes have subscribed.

The subscriber information stored in the HLR 330 may have information about services to which the subscribers (the mobile nodes) have subscribed in case where one service provider provides services by communication systems of multi-RATs.

Further, the RANs 310_1 to 310_n have information of base stations managed by themselves. In other words, with reference to FIG. 2, under the assumption that the RAN 210c is an access network receiving a paging request, the RAN 210c has information on all base stations of the RAN 210a and the RAN 210b included in the RAN 210c.

Base station information included in each of the RANs 310_1 to 310_n can be generated by a procedure defined for a Self-Organizing Network (SON).

A paging process using the mobile communication network having the aforementioned configuration will be described with reference to FIG. 4.

Figure 4:
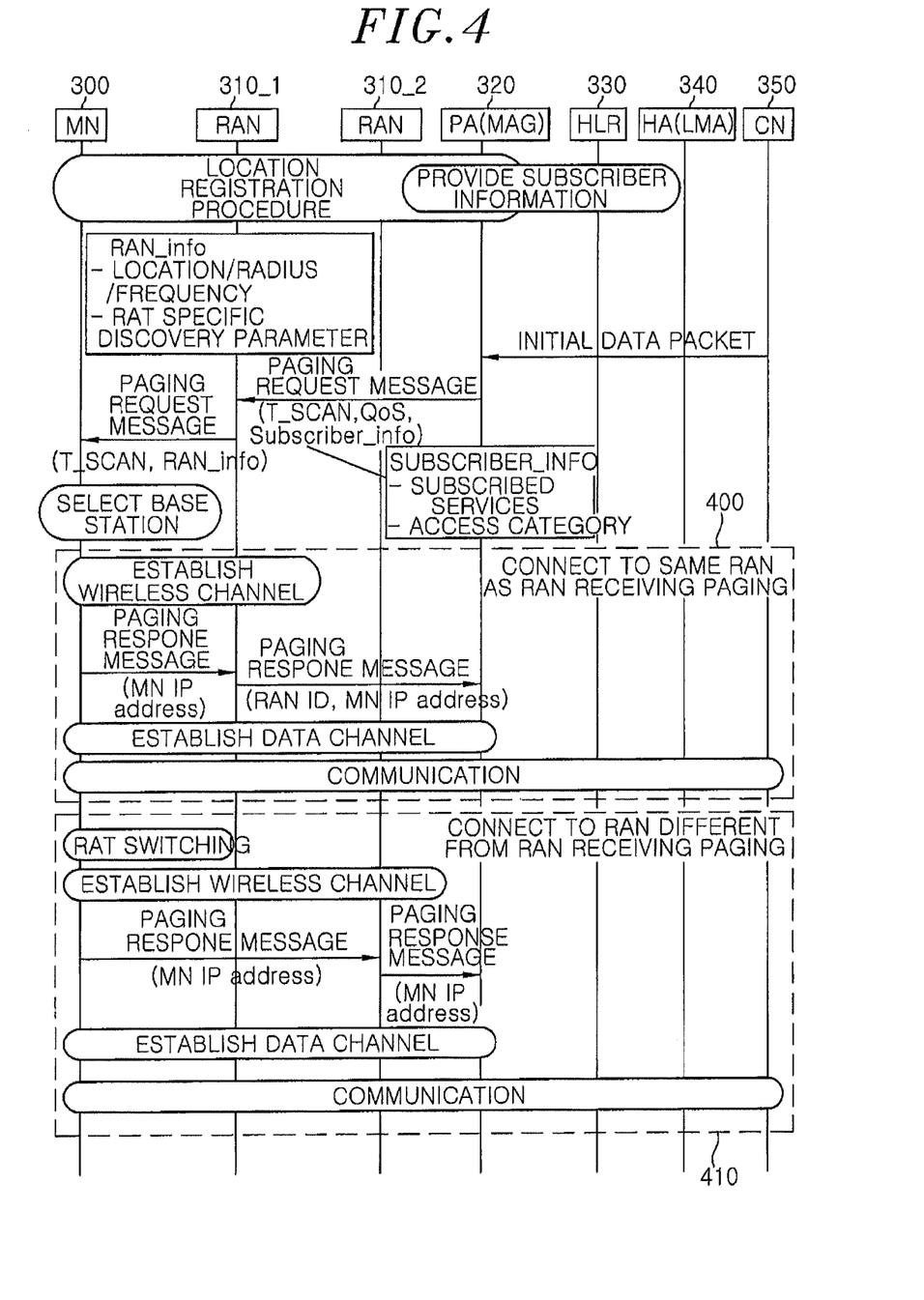
FIG. 4 is a flowchart illustrating a paging process in accordance with the embodiment of the present invention.

FIG. 4 is a flowchart illustrating a paging process in accordance with the embodiment of the present invention.

First, when a paging area changes, the mobile node 300 performs a location registration procedure. During the location registration procedure, the paging agent 320 receives subscriber information from the HLR 330 to check whether the mobile node 300 can get a location registration service at the current location. When this check is passed, the location registration procedure is completed.

That is, the paging agent 320 receives subscriber information through a subscriber data insertion procedure while communicating with the HLR 330 to check whether the mobile node 300 can get a location registration service at the current location by using the received subscriber information.

In the embodiment of the present invention, the HLR 330 changes subscriber information depending on a multi-RAT environment before it provides the subscriber information to the paging agent 320. That is, the HLR 330 provides the paging agent 320 with the subscriber information changed to have identification information in which RANs providing services to the corresponding node 300 are specified.

Thereafter, when a data packet is transmitted from the counterpart node 350, the paging agent 320 checks whether the mobile node 300 which is supposed to receive the packet is in an active state or an idle state.

As a result of the checking, when the mobile node 300 is in the idle state, the paging agent 320 generates a paging request message to initiate a paging procedure, and then sends it to the RAN 310_1. Unlike the conventional paging message, the paging request message contains available scan time T_Scan and subscriber information Subscriber_info. The available scan time T_Scan indicates the amount of time allowed for the mobile node 300 to receive a paging request message to perform a base station search.

The paging agent 320 calculates the available scan time T_Scan based on the type (QoS) of the received data packet and statistical information obtained during the conventional paging procedure so that call drop probability can become less than a predetermined value. When it is assumed that the overall delay time for controlling the call drop probability to be less than a predetermined value is represented by T_delay, and the time required to perform a paging procedure is represented by T_paging, the available scan time T_Scan is expressed by the following Eq. 1:

$$T\_Scan = T\_delay - T\_paging \qquad \text{Eq. 1}$$

Further, as described above, the subscriber information (Subscriber_info) contains information of RANs from which the mobile node 300 gets services.

The RAN 310_1, which has received the paging request message, inputs only base station information corresponding to identification information of subscriber information in the paging request message, among all of the base station information included in the RAN 310_1, in the paging request message to sends it to the mobile node 300.

In accordance with the embodiment of the present invention, only the base station information corresponding to RANs where the mobile node 300 has subscribed is included in the paging request message to be sent to the mobile node 300. Therefore, a significant increase of load on a paging channel can be avoided owing to reduction of the amount of information and searching for the base station by the mobile node 300 can become faster.

The mobile node 300, which has received the paging request message, performs a base station search based on the base station information included in the paging request message within the range of the available scan time T-Scan.

By the base station search, the mobile node 300 selects an optimum base station, and establishes a wireless channel with the selected base station, and then sends a paging response message to the paging agent 320.

On the other hand, when the selected base station is, e.g., a base station in the RAN 310_1, i.e., when the selected base station and the base station in the RAN that has sent the paging request message are identical, the same paging procedure is performed as the conventional procedure. In other words, a wireless channel is established via communication with the selected base station in the RAN 310_1, which has the selected base station to establish a data channel, thereby enabling communication between the mobile node 300 and the counterpart node 350.

When the selected base station and the base station in the RAN 310_1 that has sent the paging request message are different, the mobile node 300 activates a wireless interface corresponding to the selected base station and then is wirelessly connected to the selected base station by an RAT switching operation. In other words, if the base station selected by the mobile node 300 is, e.g., a base station in the RAN 310_2, a paging response message containing an IP address allocated from base station in the RAN 310_2 via the wireless channel establishment therewith is transmitted to the paging agent 320 through the base station in RAN 310_2. The paging agent 320 received the paging response message, establishes a data channel with the mobile node 300 through the base station in RAN 310_2. Next, the mobile node 300 performs communication with the counterpart node 350 via the established data channel.

Meanwhile, referring to FIG. 5, a description will be given of a case where a base station in a RAN from which the MN 300 has received the paging request message for a paging procedure and the actually selected base station are different and the two base stations are connected to different paging agents.

Figure 5:
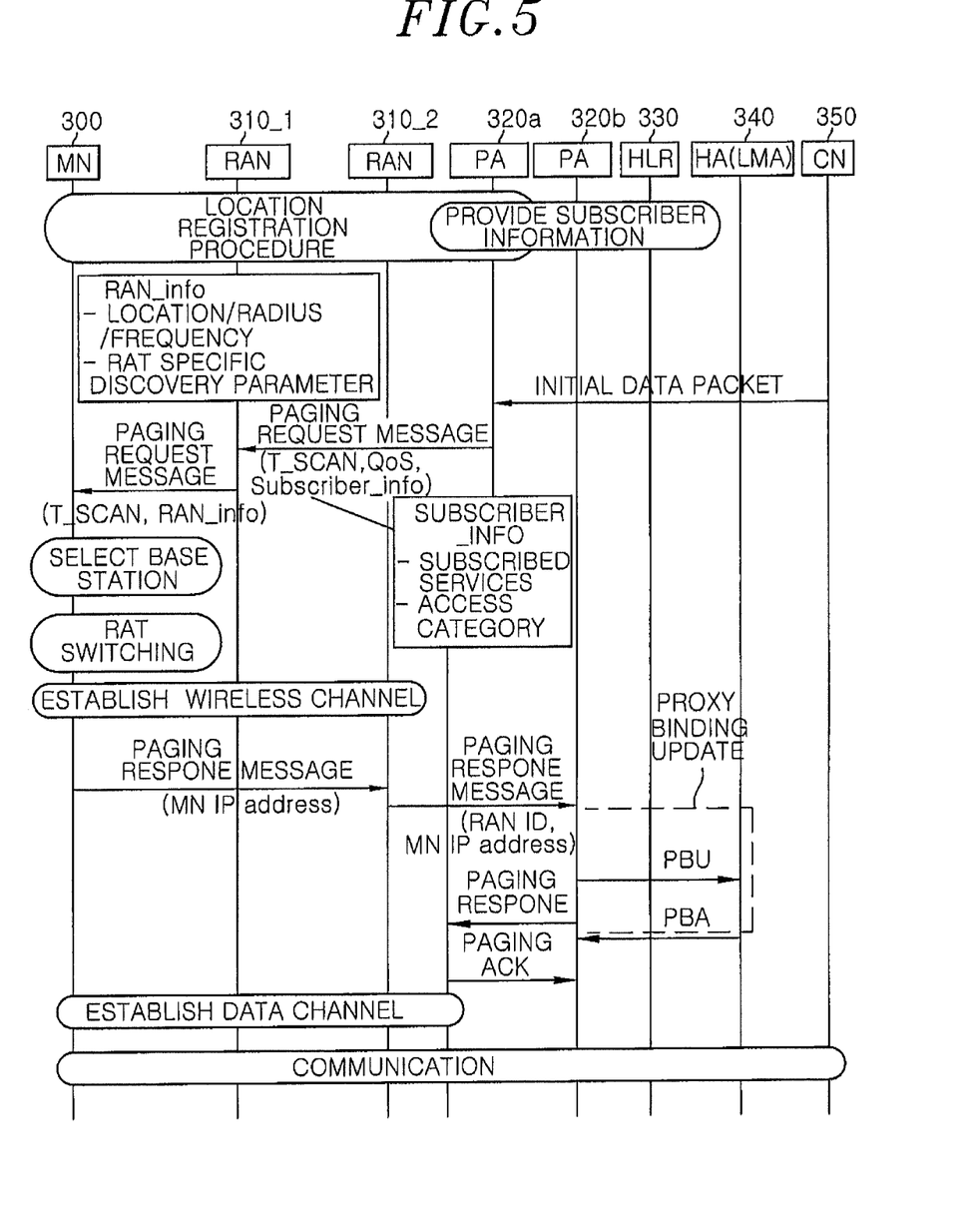
FIG. 5 is a flowchart illustrating a paging process in accordance with another embodiment of the present invention.

FIG. 5 is a flowchart illustrating a paging process in accordance with another embodiment of the present invention.

The another embodiment of the present invention will be described with respect to an example in which the mobile node 300 receives a paging request message through the RAN 310_1 and then selects a base station of the RAN 310_2 as an optimum base station, the RAN 310_1 is connected to a paging agent 320a, and the RAN 310_2 is connected to a paging agent 320b. Further, a proxy mobile IP (PMIP) is used for L3 mobility, the paging agent 320a and paging agent 320b is applied with a mobile access gateway (MAG) function, and the HLR 330, is applied with a local mobility anchor (LMA).

As shown in FIG. 5, the mobile node 300 is connected to the paging agent 320a through the RAN 310_1 and performs a location registration procedure, and the paging agent 320a receives subscriber information of the mobile node 300 from the HLR 330 to complete the location registration procedure.

Next, the paging agent 320a generates a paging request message containing available scan time information and subscriber information, and then sends it to the mobile node 300 through the RAN 310_1.

The mobile node 300 received the paging request message performs a base station search to select a base station, i.e., the base station in the RAN 310_2. Then, the mobile node is allocated an IP address by a switching operation with the selected base station in the RAN 310_2. Next, the mobile node 300 establishes a wireless channel with the selected base station in the RAN 310_2 and then sends a paging response message containing the allocated IP address to the base station in RAN 310_2.

The base station in RAN 310_2, which has received the paging response message, includes its base station ID in the paging response message, and then sends it to the paging agent 320b connected thereto.

In this way, when a paging agent is changed due to the mobile node 300's selection of the RAN 310_2, MAG may be changed. Thus, a proxy binding update (PBU) with the HLR 330 is performed. That is, the paging agent 320b sends a PBU request message to the HLR 330 for the PBU, and then receives a proxy binding update acknowledgement (PBA) message from the HLR 330.

Meanwhile, since the RAN from which the mobile 300 has received the paging request message and the RAN to which the paging response message is sent by the mobile node 300 are different, the paging agent 320a continues to wait for the paging response message. For the above reason, upon receipt of the paging response message, the paging agent 320b sends to the paging agent 320a the paging response message notifying that the paging response message is received, and then receives an acknowledgment message therefor.

After completing this process, the paging agent 320b establishes a data channel with the mobile node 300 through the RAN 310_2, and thus the mobile node 300 performs communication with the counterpart node 350.

In accordance with the present invention, the mobile nodes do not have to perform a base station search periodically in an idle state in order to find an optimum base station because base station information to be searched for is included in a paging request message by a paging procedure and sent to the mobile node, thereby minimizing the power consumption of the MN and minimizing the base station search time of the MN.

Moreover, in accordance with the present invention, only base station information corresponding to a service to which an MN subscribed is included in a paging request message since only the RAN information to which the MN subscribed is included in the paging request message and sent to the MN, whereby a significant increase of load on a paging channel can be avoided owing to reduction of the amount of information and the MN's search for a base station can be made faster.

While the invention has been shown and described with respect to the particular embodiments, it will be understood by those skilled in the art that various changes and modifications may be made without departing from the of the invention as defined in the following claims.

What is claimed is:

1. A method for searching for a base station using a paging procedure in a mobile communication network having a paging agent that performs the paging procedure, the method comprising:
   receiving, at the paging agent, subscriber information including information of a service, to which a mobile node subscribed, from a home location register while performing a location registration procedure in response to a location registration request from the mobile node;
   setting an available scan time based on the time required to perform the paging procedure;
   generating a paging request message including the available scan time and the subscriber information to send the paging request message to a base station required for paging; and
   generating base station information based on the subscriber information to input into the paging request message to transmit it with the available scan time to the mobile node,
   wherein the mobile node selects a base station by using the base station information within a range of the available scan time,
   wherein said setting an available scan time sets the available scan time based on a type of a packet received from a counterpart node of the mobile node, an overall delay time for controlling call drop probability to be less than a preset value, and the time required for the paging procedure.

2. The method of claim 1, further comprising:
   transmitting a paging response message to the paging agent after establishing a wireless channel between the mobile node and the selected base station.

3. The method of claim 1, further comprising:
   when the selected base station and the base station that has sent the paging request message to the mobile node are different, receiving, at the paging agent, a paging response message having an IP address allocated from the selected base station, from the mobile node.

4. The method of claim 3,
   wherein when the selected base station and the base station required for the paging procedure are different, the mobile node activates a wireless interface corresponding to the selected base station to perform a base station switching procedure.

5. The method of claim 2, further comprising:
   when the paging agent sent the paging request message and the paging agent that has received the paging response message are different, performing a proxy binding update procedure via communication between the paging agent received the paging response message and a home agent.

6. The method of claim 5, further comprising:
   sending, at the paging agent received the paging response message, an acknowledgment message to the paging agent sent the paging request message.

7. An apparatus for searching for a base station using a paging procedure in a mobile communication network, the apparatus comprising:
   a home location register for managing subscriber information containing information of services to which multiple mobile nodes subscribed;
   a paging agent for, upon receipt of a location registration request from a given mobile node, requesting the home location register to provide the subscriber information containing information of a service to which the given mobile node subscribed and receiving the subscriber information while performing a location registration procedure, calculating an available scan time based on the time required to perform the paging procedure upon completion of the location registration for the given mobile node, and then generating a paging request message containing the available scan time and the subscriber information to send the paging request message to a base station required for paging; and
   the base station required for paging for generating base station information based on the subscriber information to input into the paging request message to transmit it with available scan time to the given mobile node, wherein the given mobile node selects a base station by using the base station information within a range of the available scan time, wherein the paging agent calculates the available scan time based on a type of a packet received from a counterpart node of the mobile node, an overall delay time for controlling call drop probability to be less than a preset value, and the time required for the paging procedure.

8. The method of claim 7, wherein the given mobile node transmits a paging response message to the paging agent after establishing a radio channel with the selected base station.

9. The apparatus of claim 7, wherein when the selected base station and the base station that has sent the paging request message to the mobile node are different, the paging agent receives a paging response message containing IP information allocated from the selected base station, from the given mobile node.

10. The apparatus of claim 7, wherein when the selected base station and the base station that has sent the paging request message to the mobile node are different, and a paging agent connected to the selected base station and the paging agent that has generated the paging request message are different, the paging agent connected to the selected base station receives a paging response message containing an IP address allocated from the selected base station, from the given mobile node.

11. The apparatus of claim 10, wherein the paging agent connected to the selected base station sends, upon receipt of the paging response message, an acknowledgment message to the paging agent that has generated the paging request message.

12. The apparatus of claim 10, wherein the given mobile node activates a wireless interface corresponding to the selected base station to perform a base station switching procedure, and then creates the paging response message based on an IP address allocated from the selected base station.

13. The apparatus of claim 10, wherein the paging agent connected to the selected base station performs a proxy binding update procedure via communication with a home agent.

* * * * *